May 5, 1964
H. M. HIND
3,131,738
APPARATUS FOR THE REMOVAL OF SEED COATS
AND OTHER FOREIGN MATTER FROM NUTS
Filed March 19, 1962
2 Sheets-Sheet 2
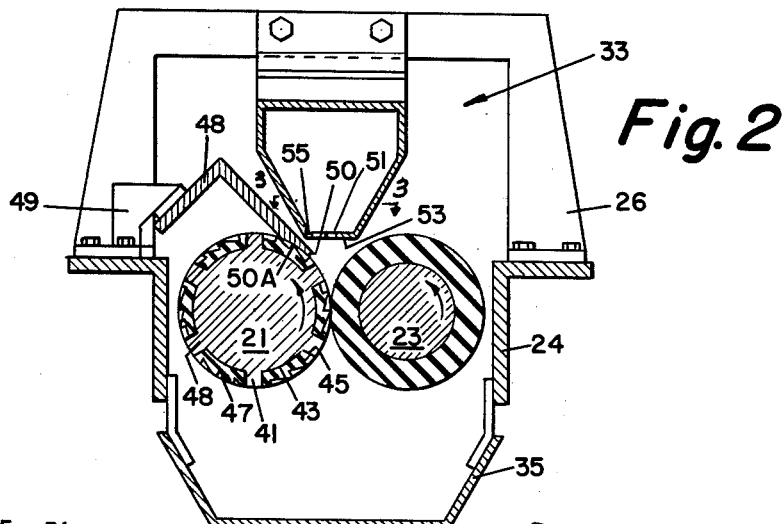
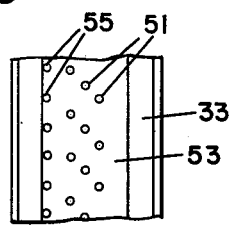
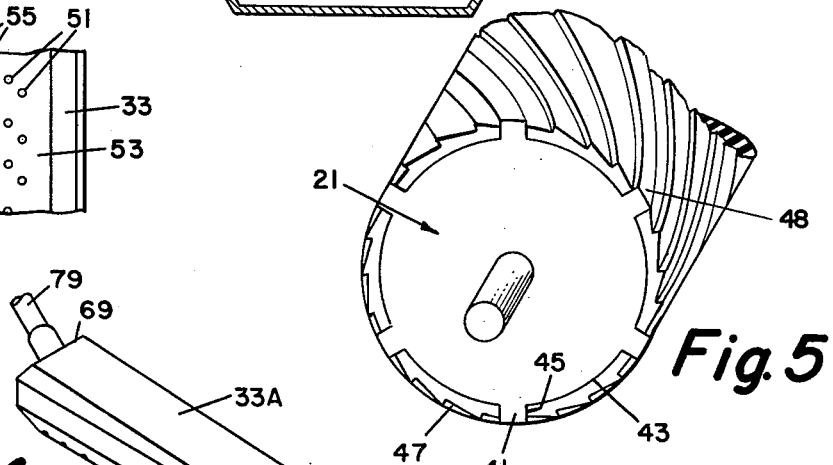
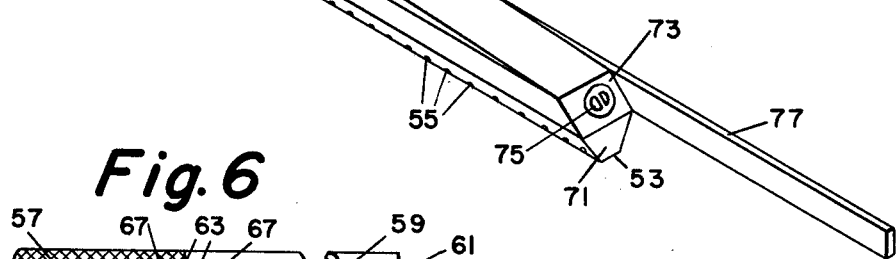
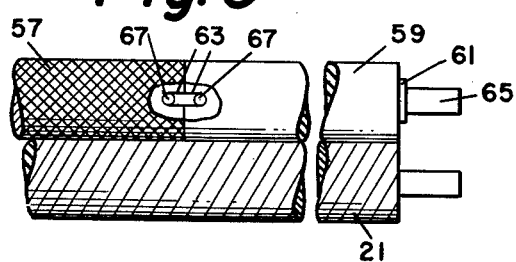
INVENTOR.
HOBART M. HIND
BY
Millman and Jacobs
ATTORNEYS United States Patent Office 3,131,738
Patented May 5, 1964

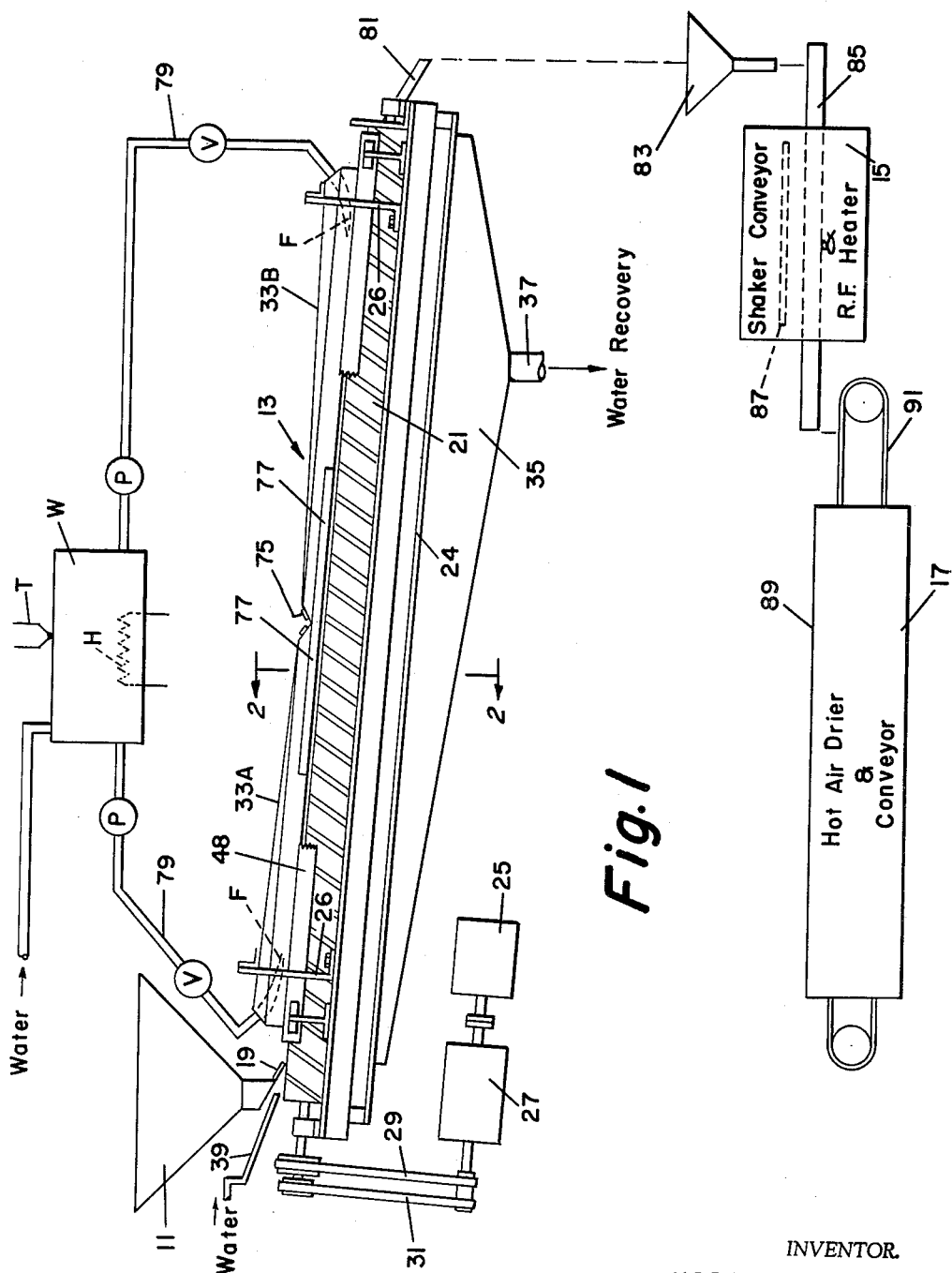

3,131,738
APPARATUS FOR THE REMOVAL OF SEED COATS AND OTHER FOREIGN MATTER FROM NUTS
Hobart M. Hind, Graceville, Fla., assignor to Mars, Incorporated, Chicago, Ill., a corporation of Illinois
Filed Mar. 19, 1962, Ser. No. 180,645
12 Claims. (Cl. 146—32)

This invention relates to an efficient apparatus for blanching and for removing foreign matter such as pieces of plant, dirt, insect infestation, etc. from nuts in general and peanuts in particular.

This application is a continuation-in-part of S.N. 12,980, filed on March 7, 1960, now Patent No. 3,077,217.

Peanut shelling mills remove the hulls and most of the visible foreign matter from the peanuts as received from the farmer. The whole nuts are graded as to size and quality on the basis of such factors as discoloration, insect damage, etc. The dicotyledons which are split apart are graded also on the basis of the amount of dirt which has accumulated on their exposed inside faces. The "splits" which are too dirty are called "dirty faces" and are sold at a relatively low price to mills for the expression of peanut oils.

Heretofore, there have been two commercially utilized methods of blanching or removing seed coats from whole peanuts, and none for blanching and cleaning "dirty faces."

One method, which is relatively inexpensive, is known as "dry blanching." This consists essentially of subjecting the nuts to temperatures as high as 325° F., then cooling the nuts and shucking them between large rubber drums. There are several disadvantages to this process. Firstly, the high temperatures utilized cause auto-oxidation of the oils of the nuts and degrades their flavor. Secondly, the drums split more than 30% of the dicotyledons. Thirdly, the nuts have a poor storage or shelf life.

The other method, which is relatively expensive, is known as "water blanching." This consists essentially of slitting the seed coats with knives, as shown, for example, in U.S. Patent No. 2,558,899; then scalding the nuts with water at nearly boiling temperatures; and finally rubbing off the seed coats by means of an oscillating pad. There are several disadvantages to this process also. Firstly, in addition to the expense, the skin slitting operation and the oscillating pad operation substantially limit this method to the processing of whole nuts of considerable diameter, such as medium to extra large Virginias; it cannot be used with small diameter nuts, such as Spanish. Secondly, the water temperatures are not high enough to destroy the hardier types of insect infestation, but are sufficiently high to denature the nut surface proteins, producing an objectionable hard surface texture in the final cooked product. Thirdly, the resultant hard surface is an impediment to the removal of excess moisture so that after the final cooking of the nuts, they have a high residual moisture content which limits their shelf life.

An object of this invention is to provide an apparatus which overcomes all of the disadvantages noted above with respect to both the dry and the wet blanching processes.

Another object of this invention is the provision of an abrasion, a hot fluid spraying and a heating means in combination to so blanch and decontaminate nuts that they do not possess protein-denatured hard surfaces or oxidized and degraded flavor and also have such a low moisture content as to render them storable for long periods of time without danger of mold growth.

Another object of this invention is the provision of a variable conveyor means, a variable abrasion roller means and a variable hot water spray means to accommodate all species and grades of nuts from Spanish #1 having the thinnest of seed coats and plant wax to Virginias having the thickest of seed coats and plant waxes.

Yet another object of this invention is to provide an inexpensive and easily operable apparatus for blanching and removing foreign matter from all species and grades of nuts, whether whole or split, and particularly from "dirty faces" whereby the latter can be safely used in comestibles, such as peanut butter and confections.

These and other objects of this invention will become more apparent from the following description taken in conjunction with the accompanying drawings, wherein:

FIGURE 1 is a diagrammatic view in elevation of the overall apparatus;

FIGURE 2 is a cross-sectional view taken along the line 2—2 in FIGURE 1;

FIGURE 3 is a cross-sectional view taken along line 3—3 of FIGURE 2;

FIGURE 4 is a perspective view of a spray head component;

FIGURE 5 is an enlarged fragmentary perspective view of the feed roll; and

FIGURE 6 is an enlarged fragmentary view of a two part abrasion roll and the feed roll.

Referring to the drawings, it may be seen that the nut treating apparatus comprises a hopper 11 which receives the nuts from an overhead source, not shown, and which feeds the nuts to an abrasion device 13 which cleans and blanches the nuts and which in turn feeds the nuts to a radio frequency heater 15 and to a hot air dryer 17.

The hopper 11 may be a surge hopper which has attached thereto a rheostat controlled vibrator, not shown, which controls the rate of feed of the nuts to the variable abrasion device by way of a chute 19.

The abrasion device comprises a pair of parallel rotating rolls 21 and 23 which are almost but not quite in abutment. The rolls are end-supported in an elongated frame 24 in suitable bearings at a slight incline, the higher end being under the hopper 11, the rolls being driven both in a counterclockwise direction as seen in FIGURE 2 and preferably at differing rates of revolution. The roll drive may be provided by a motor 25, a variable speed transmission 27 and a belt drive 29 and 31 to each roll. Supported above the rolls on the frame 24 by suitable brackets 26 and substantially coextensive therewith is a spray head 33, which may be formed as two independent portions, one an upper portion 33A from the infeed end to the approximate center of the unit, and the other a lower portion 33B from the approximate center to the discharge end. Supported below the rolls is a catch basin 35 having a drain outlet 37.

A small water nozzle 39 is provided behind the hopper chute 19 which is aimed parallel with and towards the upper groove or trough formed by the two rolls 21 and 23. The stream of water, which may be ¼" in diameter and at a pressure of 60 p.s.i., deflects and carries the nuts, as they fall from the hopper chute 19, down a short distance of the length of the roll trough. This action tends to uniformly distribute the nuts at the infeed end of the rolls and prevents pile-ups and spill-overs of the nuts at said infeed end.

Roll 21 serves as a nut conveyor roll while roll 23 serves as an abrasion roll. The conveyor roll 21 may be made of a metal billet, such as stainless steel or aluminum which is helically threaded or grooved along its entire length as shown in FIGURE 5 to provide a plurality of metal splines or lands 41. The grooves between the metal splines have bottoms 43 and side walls 45 which are coated with rubber, the bottoms 43 themselves being helically threaded to provide triangular grooves or gripping serrations 47. In practice, the metal billet is entirely coated with rubber and the same is removed only at the outer surfaces 48 of the splines or lands 41 to render said surfaces metallic. The nuts are adapted to be positioned on the rubberized serrations 47 during conveyance.

The rubber is used to minimize any possible splitting or other damage to the nuts while removing their seed coats and other foreign matter. The metal lands are provided to break any large foreign matter, such as wood, which may have accidentally been carried along with the nuts. To avoid any loss of pieces of nut between the rolls, the helical rubber grooves are so cut into the conveyor roll 21 that the total distance from the depth of the thread to the abrasion roll 23 is slightly less than one-half of the diameter of the nuts being processed. Thus, by substituting conveyor rolls of different diameter, and changing the gap between the rolls, the system can accommodate any size of nut. To secure a larger force vector upwardly against the abrasion roll 23 and a smaller force vector upwardly, the angle of the plane of the rubber groove helix with respect to the axis of the conveyor roll 21 may be varied. Angles of 22½° to 45° have been found effective.

The abrasion roll 23 is made of rubber with a crepe finish. The roll may be made in a single length with a uniform abrasive finish, in a single length with variable abrasive finish along its length or in several lengths of different abrasive finish joined together. If a uniform finish single roll is used it must have a surface which is rough enough to scuff the seed coat and yet smooth enough to preclude damage to an already blanched nut. To obtain an adequate conveyance speed and relative abrasion speed between the rolls, the rolls may be driven at different speeds in the same direction. A conveyor roll speed of 100 r.p.m. and an abrasion roll speed of 125 r.p.m. for example, have been found satisfactory.

A scraper or doctor bar 48, preferably an angulated bar, is supported on the frame 24 by means of suitable brackets 49 above and over the complete length of the conveyor roll 21, the same including a free edge 50 beneath the sprayer head 33 and in the trough between the rolls 21 and 23. The bar includes an arcuate undercut portion 50A leading to the free edge 50 which is closely adjacent the conveyor roll 21, as seen in FIGURE 2, and serves to scrape seed coats and foreign matter from the roll 21 as well as to confine the nuts in the trough immediately beneath the spray holes of the sprayer head 33.

The spray head 33 is a hollow member of tapered cross-section having a plurality of small holes 50 spaced longitudinally in zig-zag fashion along the bottom wall 53 thereof, said wall being positioned above the trough between the rolls and terminating directly above the free end 50 of the scraper bar 48. The bottom wall also has provided therein a row of longitudinally spaced holes 55 in substantial vertical alignment with and above the free end 50 of the scraper bar 48. It is necessary that the spray temperature be high enough to soften the plant wax to allow for relative movement between the seed coat and the nib, but low enough to avoid protein denaturation; e.g. 140° F. to 175° F. It is also necessary that the spray pressure, in conjunction with the mild abrasion of the roll 23 and the conveying action of roll 21, lift and remove the seed coat and all foreign matter from the nuts and wash them away without splitting the nuts. Various combinations of pressure, temperature and abrasive action may be used to accomplish this.

Thus if the roll 23 is provided with a uniform abrasive surface throughout its length, the upper spray head section 33A may be provided with fluid under a pressure, e.g. 30–40 p.s.i., which is greater than that in the lower section 33B, e.g. 20–30 p.s.i., to effect stronger abrasion at the first stage of the operation where initial removal of seed coats is required, and milder abrasion at the second or final stage where a good deal of blanching has already taken place and more of the nut is exposed. Similarly, while the temperature of the fluid spray must not exceed the protein denaturation temperature, but above the wax softening point, to effect better and quicker initiation of abrasion in the first stage, the temperature of the spray in the upper section 33A can be higher than that in the lower section 33B. If a single spray head delivering a spray at a predetermined uniform temperature and pressure range is used then the roll 23 can be made with a variable abrasive finish with rougher abrasion of the infeed end and milder abrasion at the discharge end. Also, a first portion of the abrasion can be dry and the second half wet. A method of determining the relative lengths of dry and wet abrasion is to abrade a grade of nuts for a given length of time and for a given speed of rotation so that the abrasion is slightly too great as evidenced by the marring of the nuts under the seed coat, and then employing the same method while introducing the fluid spray at various distances from the delivery end of the rolls until there is no marring of the nuts. Also air under pressure, preferably moisture-laden, and at a temperature capable of softening the plant wax but below that which will denature the protein surface may be used.

Although a unitary abrasion roll may be provided having a first length with one type of abrasion surface and a second length with a different type of abrasion surface, it may at times be desirable to removably couple two rolls with different abrasion surfaces to allow for greater variability of abrasive action. Thus the abrasion member may be two rolls 57 and 59, the first leading to the infeed end of the machine and having a harsher abrasive surface, such as knurled steel, the second leading to the discharged end and having a milder abrasive surface, such as crepe rubber. Although a number of means of removably coupling the abrasive rolls endwise may be employed, one means suitable for the purpose, consists of metal sleeves 61 extending axially through each length of roll, the opposite ends of the sleeves including short axial slots 63 terminating at the inner end faces of each roll, see FIGURE 6. A single mandrel 65 is provided which extends through the sleeves 61 and exceeds the length of the combined rolls 57 and 59, the end portions of the mandrel extending beyond the rolls being the pintles which are journaled in the bearings or end supports thereof. At the center of the mandrel, a few inches apart, the same is provided with radial pins 67, which terminate below the surface of the abrasive rolls. The abrasive rolls to be connected are slipped on to the mandrel from the free ends thereof until the meeting faces abut and the radial pins 67 are received in the end axial slots 63.

Coming now to the sprayer, each spray head 33A and 33B has an outer end 69 and an inner closed end 71, the latter including an inclined face 73 for ready access to a cleanout plug 75. Adjacent the inner end 71 there is fixedly or removably secured to the sides of each spray head a bar 77 serving as one of a number of means to connect the spray heads 33A and 33B together, fixedly or removably, for extension over the conveyor and abrasion rolls. Coupled to the outer end 69 is a conduit 79 in which is removably positioned a conical filter F and which is operatively connected to a source of water W that is heated by a conventional element H under thermostatic control T to the desired temperature range. A pump P delivers the heated water under the desired pressure range through a valve V in the conduit 79 to each spray head 33A and 33B. Thus each head can be made to apply fluid to the nuts under a predetermined pressure and temperature range.

As the nuts are being conveyed in the trough or path between the rolls, fluid, preferably water, is sprayed at the aforementioned predetermined pressures and temperatures on the nuts via the zig-zag holes or perforations 51 and the line of holes or perforations 55 of the spray head 33. Because the holes 55 are substantially vertically in line with and above the free end 50 of the scraper 48 and the nuts are more or less confined in a trough between said free end 50 and the abrasive rubber roll 23, the effect of the stream of water from the holes 55 is to create a turbulence tending to tumble the nuts while urging them into the trough, thereby increasing not only the efficiency of melting the plant wax and loosening the seed coats but also the efficiency of the abrading action. The fact also that the abrasion roll 23 can have a varying abrasive surface along its length or consist of end-connected sectional abrasive rolls 57 and 59 of differing abrasive surfaces, or that the pressure and/or temperature in the connected but independent spray heads 33A and 33B can be different along the conveyance-abrasion path or that the relative rates of rotation of the conveyor roll 21 and abrasion roll 23 can be varied provides controlled efficiency of seed coat and foreign matter removal of very high degree while preventing denaturation of the surface protein as well as unnecessary splitting and marring of the nuts.

The water from the spray heads 33 and the distribution nozzle 39, together with the washed down seed coats and other foreign matter, is caught by a catch basin 35, filtered and recycled back to the system boilers and pumps for reuse by the spray heads. This may be accomplished by passing the catch basin water through an endless belt of 50 mesh stainless-steel wire on a stainless steel web which is driven at a slow speed. The seed coats and foreign matter are deposited on the mesh from which they may be subsequently removed.

The blanched nuts are fed from the ends of the rolls 21 and 23 to a chute 81 to a vibrator controlled surge hopper 83 to a shaker conveyor belt 85 which removes excess moisture, and then through the radio frequency heater 15. The RF heater may be a conventional vacuum type with revolving gates, electrodes, generators, etc. The temperature and time in the heater should be adequate to dry the nuts and destroy any insect infestation. For example, an RF heater such as that made by Reeves Electronics, Inc. of Chicago, Ill., operating on 15 kilowatts and 14.5 megacycles will heat 1000 pounds of blanched nuts per hour to a uniform temperature of 160° F. Somewhat better results can be obtained with an RF heater operating at 20 kilowatts and 12–27 megacycles. The Reeves RF heater is one in which the conveyor 85 passing therethrough is the negative pole while the perforated platen 87 is the positive pole.

From the RF dryer the nuts are fed to a conventional hot air dryer 89 that includes a stainless steel mesh belt 91. It has been found that the use of radio frequency drying immediately before hot air drying makes it possible to employ relatively high air temperatures without increasing the temperature of the nuts. The evolution of water vapor at the surface of the nuts as a result of the RF heating which starts from the center thereof is so rapid that the nuts actually cool during the hot air drying, despite the use of elevated temperatures therein.

The blanching operation has in practice resulted in approximately 95% blanched nuts. After air drying the nuts are sorted for color and carried to bins where they may be further dried to a moisture content for storage and packaging which will permit a relatively long shelf life. This should not exceed 5% but may go as high as 6% where the nuts are shipped rapidly. Nuts which are unblanched or partially blanched and nuts which have dark spots or areas are rejected. Then rejects may be dried to a 7.5% moisture content which is the moisture content for raw shelled nuts and sent through the blanching process again.

While a preferred embodiment of the present invention has been shown and described hereabove, it will be understood that skilled artisans may make minor variations without departing from the spirit of the invention and the scope of the appended claims.

I claim:

1. Apparatus for removing seed coats and foreign matter from shelled nuts comprising an elongated rotatable screw conveyor, a rotatable abrasive member coextensive therewith, the depth of the thread in said conveyor and the distance between the surfaces of said conveyor and said abrasive member being so related to the diameter of the nuts as to prevent them from falling between the conveyor and the member as they are conveyed while said abrasive member acts on the seed coats and means to spray hot fluid on the nuts anywhere along the length of said conveyor and means to maintain the fluid at a temperature sufficient to soften the plant wax but below that which will denature the surface protein.

2. The apparatus of claim 1 and means for spraying the hot fluid under pressure sufficient to raise the seed coats and expose the plant wax but insufficient to split the nuts.

3. The apparatus of claim 1 wherein said abrasive member includes a plurality of removably connected rolls of differing abrasive surfaces.

4. The apparatus of claim 1 and means to heat the clean blanched nuts at a temperature below that required to denature the surface protein and reduce the moisture to a content not greater than 6%.

5. Apparatus for removing seed coats and foreign matter from shelled nuts comprising an inclined frame, an elongated screw conveyor and an abrasive member coextensive therewith, said abrasive member comprising a plurality of removably connected rolls of differing abrasive surfaces, means removably journaling said conveyor and member on said frame, means to deliver shelled nuts to said conveyor at the high side thereof, means at the low side of said frame for receiving clean blanched nuts, means above said frame to spray hot fluid on the nuts anywhere along the path of their conveyance, and means to maintain said fluid at a temperature sufficient to soften the plant wax without denaturing the surface protein.

6. Apparatus for removing seed coats and foreign matter from shelled nuts comprising a rotatable elongated screw conveyor and a rotatable abrasive member adjacent to and coextensive therewith and means to apply hot fluid under pressure to the nuts as they are being conveyed and abraded in the path between said conveyor and abrasive member, and means to maintain said fluid at a temperature sufficient to soften the plant wax without denaturing the surface protein, said means to apply the hot fluid including a sprayer having connected but independent perforated heads and means operatively connecting each head to a fluid source whereby said heads can deliver fluid under different pressures and/or temperatures.

7. The apparatus of claim 6 wherein said abrasive member includes rolls of different abrasive surfaces removably connected end to end.

8. The apparatus of claim 6 wherein said elongated screw is a threaded metal cylindrical member, only the grooves of the threads being coated with rubber.

9. The apparatus of claim 8 wherein said abrasive member is a rubber roll of crepe finish.

10. The apparatus of claim 9 and means to rotate said screw conveyor and abrasive roll in the same direction and at different rates.

11. Apparatus for removing seed coats and foreign matter from shelled nuts comprising an elongated screw conveyor and an abrasion roll coextensive with and adjacent to said conveyor forming a nut-receiving trough therebetween, means to rotate said conveyor and abrasion roll, an elongated scraper member coextensive with said conveyor having a portion closely adjacent said conveyor and terminating in a longitudinal edge at said trough, a hot fluid sprayer above said conveyor and abrasion roll including a wall directly above said trough, said wall being provided with longitudinally spaced spray holes, one line of which is in substantial vertical alignment with said longitudinal edge of said scraper to help confine the nuts in the trough and also create a swirl thereat to assist the abrasion and means to maintain the hot fluid at a temperature sufficient to soften the plant wax but below that which will denature the surface protein.

12. The apparatus of claim 11 wherein said sprayer consists of several connected but independent heads each operatively connected to a source of hot fluid under pressure whereby said heads can deliver fluid under different pressures and/or temperatures.

References Cited in the file of this patent
UNITED STATES PATENTS

| | | |
|---|---|---|
| 959,904 | Wolfe | May 31, 1910 |
| 1,431,985 | Scheman et al. | Oct. 17, 1922 |
| 2,179,579 | Morral et al. | Nov. 14, 1939 |
| 2,366,711 | Earle | Jan. 9, 1945 |
| 2,405,292 | Curlee | Aug. 6, 1946 |
| 2,433,730 | Bridge | Dec. 30, 1947 |
| 2,579,245 | Steiner | Dec. 18, 1951 |
| 2,594,995 | Richmond | Apr. 29, 1952 |
| 2,651,345 | Schoolcraft | Sept. 8, 1953 |
| 2,964,080 | Gardner | Dec. 13, 1960 |